US012747743B2

(12) United States Patent
Haag et al.

(10) Patent No.: US 12,747,743 B2
(45) Date of Patent: Sep. 29, 2026

(54) ELECTROMECHANICAL BRAKE ACTUATOR, DRIVE ASSEMBLY FOR AN ELECTROMECHANICAL BRAKE ACTUATOR AND METHOD FOR OPERATING AN ELECTROMECHANICAL BRAKE ACTUATOR

(71) Applicant: Robert Bosch GmbH, Stuttgart (DE)

(72) Inventors: Florian Haag, Ellhofen (DE); Markus Schuster, Helmstadt (DE); Martin Marquart, Ludwigsburg (DE); Nikolas Loeffelmann, Dielheim (DE)

(73) Assignee: Robert Bosch GmbH, Stuttgart (DE)

( * ) Notice: Subject to any disclaimer, the term of this patent is extended or adjusted under 35 U.S.C. 154(b) by 115 days.

(21) Appl. No.: 18/866,708

(22) PCT Filed: Jun. 2, 2023

(86) PCT No.: PCT/EP2023/064869
§ 371 (c)(1),
(2) Date: Nov. 18, 2024

(87) PCT Pub. No.: WO2023/237448
PCT Pub. Date: Dec. 14, 2023

(65) Prior Publication Data

US 2026/0185546 A1 Jul. 2, 2026

(30) Foreign Application Priority Data

Jun. 8, 2022 (DE) ..................... 10 2022 205 837.2

(51) Int. Cl.
*F15B 15/08* (2006.01)
*F15B 15/22* (2006.01)
(Continued)

(52) U.S. Cl.
CPC ............ *F15B 15/088* (2013.01); *F15B 15/22* (2013.01); *H02K 7/06* (2013.01); *H02P 3/04* (2013.01)

(58) Field of Classification Search
CPC .......... H02P 3/04; F15B 15/088; B60T 7/042; B60T 13/745
See application file for complete search history.

(56) References Cited

U.S. PATENT DOCUMENTS 3,698,772 A * 10/1972 Nixon ................. B60T 8/17613 303/61
3,790,225 A 2/1974 Wehde
(Continued)

FOREIGN PATENT DOCUMENTS

DE 102013213888 B3 11/2014
DE 102018212392 A1 1/2020
(Continued)

OTHER PUBLICATIONS

International Search Report for PCT/EP2023/064869, Issued Oct. 6, 2023.

*Primary Examiner* — Abiy Teka
(74) *Attorney, Agent, or Firm* — Norton Rose Fulbright US LLP

(57) ABSTRACT

A drive assembly for an electromechanical brake actuator. The drive assembly includes: an electric motor; a transmission coupled to the motor, having an actuating member that is couplable to a pressure generating device and linearly adjustable by the motor against a restoring force to actuate the pressure generating device; a control device electrically connected to the motor for controlling the motor; a switch activatable by the transmission by a movement of the actuating member, and an electric braking circuit electrically connected to the motor and the switch and is activatable by activating the switch and an electrical activation voltage;
(Continued)

wherein the activation voltage is generated by the motor when the motor acts as a generator when the control device fails by absorbing the restoring force acting on the actuating member, and the braking circuit brakes the motor to generate a force that counteracts the restoring force by the motor.

10 Claims, 4 Drawing Sheets

(51) Int. Cl.
*H02K 7/06* (2006.01)
*H02P 3/04* (2006.01)

(56) References Cited

U.S. PATENT DOCUMENTS

| | | | | |
|---|---|---|---|---|
| 2009/0115247 | A1 | 5/2009 | Leiber et al. | |
| 2010/0026083 | A1* | 2/2010 | Leiber | B60T 7/042 303/3 |
| 2010/0133051 | A1 | 6/2010 | Trimpe et al. | |
| 2017/0166176 | A1* | 6/2017 | Yang | B60T 13/166 |
| 2018/0326959 | A1* | 11/2018 | Micke | B60T 8/4081 |
| 2019/0092298 | A1 | 3/2019 | Bach et al. | |
| 2019/0100188 | A1 | 4/2019 | Lee | |
| 2019/0299960 | A1 | 10/2019 | Krajci et al. | |
| 2020/0384972 | A1 | 12/2020 | Calvo Martinez et al. | |

FOREIGN PATENT DOCUMENTS

| | | | |
|---|---|---|---|
| JP | 2009166579 | A | 7/2009 |
| JP | 2020517517 | A | 6/2020 |
| JP | 2023050324 | A | 4/2023 |

* cited by examiner

ELECTROMECHANICAL BRAKE ACTUATOR, DRIVE ASSEMBLY FOR AN ELECTROMECHANICAL BRAKE ACTUATOR AND METHOD FOR OPERATING AN ELECTROMECHANICAL BRAKE ACTUATOR

FIELD

The present invention relates to an electromechanical brake actuator, to a drive assembly for an electromechanical brake actuator and to a method for operating an electromechanical brake actuator.

BACKGROUND INFORMATION

Electromechanical brake boosters are typically used to amplify an actuating force manually generated on a brake pedal by a master brake cylinder being actuated by means of an electric motor. In brake-by-wire systems, in which a control signal is generated by pressing the brake pedal or in another way and an electrohydraulic actuator is actuated based on the control signal to generate brake pressure, actuators are also used that are constructed in a similar way to electrohydraulic brake boosters.

Germany Patent No. DE 10 2013 213 888 B3 describes an electromechanical actuator for a braking system with a master brake cylinder, an electric motor and a transmission that couples the electric motor to the master brake cylinder in order to convert a movement of the motor into an actuation of the master brake cylinder.

If, in an actuator constructed in this way, the control of the electric motor fails in a state in which the electric motor actuates the master brake cylinder or generally the pressure generating device in order to build up hydraulic pressure, for example due to a loss of power supply, the transmission is subjected to a restoring force by the built-up hydraulic pressure. The transmission is actuated by the restoring force and causes the electric motor to rotate, so that it operates as a generator. Because an uncontrolled pressure reduction would cause an uncontrolled actuation of the transmission, the electric motor is usually braked via an electronic braking circuit in order to avoid damage to components, in particular the transmission. However, it is also desirable for the pressure reduction to occur as quickly as possible in the event of a motor failure in order to be able to quickly initiate efficient compensation measures to generate the necessary braking pressure.

SUMMARY

The present invention provides a drive assembly for an electromechanical brake actuator, an electromechanical brake actuator, and a method.

According to a first aspect of the present invention, a drive assembly for an electromechanical brake actuator is provided. According to an example embodiment of the present invention, the electromechanical brake booster includes an electric motor, a transmission kinematically coupled to the motor, which transmission has an actuating member that can be coupled to a pressure generating device and that can be linearly adjusted by the motor in a first direction against a restoring force to actuate the pressure generating device, a control device electrically connected to the motor for controlling the motor, a switch that can be activated by the transmission as a result of a movement of the actuating member in a second direction, and an electric braking circuit that is electrically connected to the motor and the switch and can be activated by activating the switch and an electrical activation voltage, wherein the activation voltage is generated by the motor when it acts as a generator in the event of a failure of the control device by absorbing the restoring force acting on the actuating member, and wherein the braking circuit is designed to brake the motor in order to generate a force that counteracts the restoring force by means of the motor.

According to a second aspect of the present invention, an electromechanical brake actuator is provided. According to an example embodiment of the present invention, The electromechanical brake actuator has a drive assembly according to the first aspect of the present invention and a pressure generating device that is coupled to the actuating member of the transmission and has a hydraulic connection for providing hydraulic fluid to a wheel brake. The pressure generating device is designed to generate a hydraulic pressure by displacing hydraulic fluid.

According to a third aspect of the present invention, a method for operating an electromechanical brake actuator according to the second aspect of the present invention is provided. According to an example embodiment of the present invention, the method comprises controlling the motor by means of the control device such that the motor moves the actuating member in the first or the second direction in order to build up or reduce a hydraulic pressure by means of the pressure generating device. In the event of a failure of the control device, for example due to a failure of the supply voltage or because a fault occurs in the control device itself, the actuating member of the transmission is moved in the second direction by a restoring force acting as a result of the built-up hydraulic pressure. The actuating member moving in the second direction drives the motor as a generator, so that the motor generates an activation voltage, and the switch is activated by the transmission as a result of the movement of the actuating member in the second direction. In a further step, the braking circuit is activated when the braking circuit is supplied with the activation voltage and the switch is activated. Furthermore, the motor is braked by the braking circuit, so that the motor generates a force counteracting the restoring force, which slows down the movement of the actuating member in the second direction.

A concept addressed by the present invention is that of activating a passive electronic braking circuit that brakes the electric motor when the control device fails, not immediately when the control device fails, but only under the additional condition that the linearly retracting parts of the transmission trigger an activation switch that in turn activates the braking circuit. This makes it possible for the transmission to initially run freely or unbraked over a certain distance due to the hydraulic pressure returning from the pressure generating device as a restoring force, before being braked by the motor braked by means of the braking circuit. In particular, this allows the pressure generating device to initially reduce the pressure without braking, which advantageously reduces the time required for the pressure reduction.

Advantageous example embodiments and developments of the present invention can be found in the disclosure herein.

According to some embodiments of the present invention, the motor can have a control circuit, for example a bridge circuit, which can be switched by the control device to operate the motor, and the braking circuit can be configured to switch the control circuit to brake the motor. For example, the braking circuit can switch the control circuit in such a way that the poles and/or individual phases of the motor are short-circuited via the control circuit, so that at least parts of a rotor winding and/or a stator winding of the motor form an eddy current brake.

According to some embodiments of the present invention, the braking circuit can be designed to detect a failure of the control device, in particular based on a failure signal output by the control device, and is only activated when a failure of the control device is detected. For example, the control device can be designed to output a signal, for example in the form of an electrical voltage, to the braking circuit during normal operation. If this signal is missing when the control direction fails, the braking circuit detects that there is a failure of the control device. For detection purposes, the braking circuit can, for example, have a switch that is closed in the de-energized state. If the signal from the control device is missing, this switch closes.

According to some embodiments of the present invention, the actuating member can be movable between a starting position and an end actuation position, wherein the restoring force biases the actuating member in the direction of the starting position, and wherein the switch is arranged such that it is activated in an activation position of the actuating member in which the actuating member is closer to its starting position than to its end actuation position. In order to build up pressure by means of the pressure generating device, the actuating member can be displaced in the first direction, i.e., from its starting position in the direction of the end actuation position. To reduce the pressure, the actuating element can be moved in the second direction, i.e., toward the starting position. The switch is positioned relative to the transmission in such a way that when the pressure is reduced it is only triggered when the actuating element is closer to its starting position than to the end actuation position. This ensures that the transmission can freewheel over at least 50 percent of the maximum stroke that the actuating member can perform. In this way, the pressure reduction is further accelerated.

In general, according to an example embodiment of the present invention, it can be provided that the starting position and the end actuation position define a maximum stroke of the actuating element. According to some example embodiments of the present invention, the activation position can be remote from the starting position by a distance that is in a range between 5 percent and 40 percent of the maximum stroke. Thus, the activation switch is only activated or operated shortly before the actuating member reaches its starting position. In this way, the pressure reduction is further accelerated.

According to some example embodiments, the switch can be designed as a proximity switch, in particular as a reed switch or as a Hall switch. For example, the transmission can be provided with a proximity element, for example a magnet piece, and the proximity sensor is positioned relative to the transmission such that the proximity element approaches the proximity sensor when the actuating member moves in the second direction, so that said proximity sensor outputs a signal to the braking circuit.

Some example embodiments of the present invention, the switch can be designed as a mechanically triggered switch. The switch can be preloaded to an open state, for example by a spring or similar, and is closed by an element of the transmission, whereby the switch in the braking circuit closes an electrical switch.

According to some example embodiments of the present invention, the actuating member can be formed by a threaded spindle that is linearly guided by a guide part connected thereto for conjoint rotation and is linearly adjustable by a drive nut that can be rotated by the motor, wherein the switch can be triggered by the guide part. This offers the advantage that the guide part already serves as a support structure for sensor elements, which particularly facilitates the integration of a proximity switch into the drive assembly.

According to some example embodiments of the present invention, the motor can be designed as a brushless DC motor having a permanently excited rotor, a stator that has at least three coil assemblies, and a commutation circuit connected to the coil assemblies, which commutation circuit can be controlled by the control device, wherein the braking circuit is designed to short-circuit at least two coil assemblies, so that they act as an eddy current brake. The commutation circuit thus forms a control circuit of the motor and can be implemented, for example, as a B6 bridge circuit.

According to some example embodiments of the present invention, the pressure generating device can comprise a cylinder and a piston received in the cylinder, which piston is movable by the actuating member in a forward direction and a reverse direction to displace hydraulic fluid, wherein the hydraulic connection is formed by a connection bore in the cylinder, and wherein the cylinder has a snifter bore that is exposed by the piston when it is moved in the reverse direction to connect the cylinder to a reservoir. The pressure generating device can therefore be, for example, a master brake cylinder or a plunger. By providing the activation switch to activate the braking circuit, the piston can move in the reverse direction to reduce pressure over a relatively large range with only small counterforces, which are substantially equal to the frictional forces in the transmission and the motor. This ensures that the snifter bore is released more quickly. This facilitates rapid compensation of the failure of pressure generation, because backup systems, such as an ABS system, may require hydraulic fluid from the reservoir.

The present invention is explained below with reference to the figures.

DETAILED DESCRIPTION OF EXAMPLE EMBODIMENTS

In the figures, identical reference signs denote identical or functionally identical components, unless stated otherwise.

Figure 1:
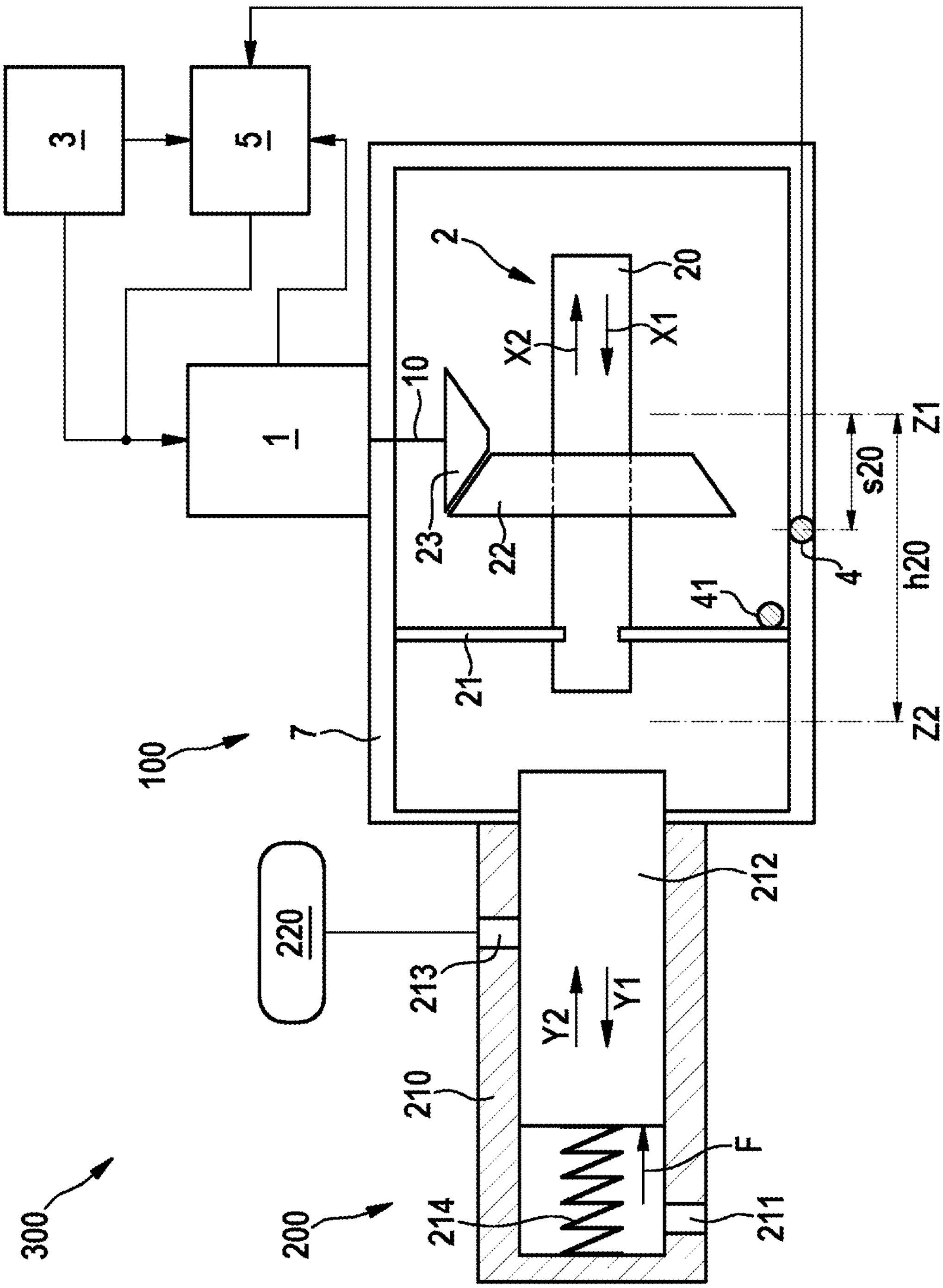
FIG. 1 is a schematic sectional view of an electromechanical brake actuator according to an exemplary embodiment of the present invention.

FIG. 1 shows an electromechanical brake actuator 300 by way of example and in a purely schematic manner. As shown in FIG. 1, the brake actuator 300 comprises a drive assembly 100, having an electric motor 1, a transmission 2, a control device 3, an activation switch 4 and an electric braking circuit 5, and a pressure generating device 200.

The pressure generating device 200 is generally designed to generate a hydraulic pressure and can be actuated by the drive assembly 100. As shown in FIG. 1 by way of example, the pressure generating device 200 can comprise, for example, a cylinder 210, a piston 212 and optionally a reservoir 220. The cylinder 210 has a connection 211, for example in the form of a bore, which can be formed in particular in a first end region of the cylinder 210. Via this connection 211, the pressure generating device 200 can be connected to one or more wheel brakes (not shown). Furthermore, the cylinder 200 has, in particular in a second end region, a snifter bore 213 through which the cylinder 210 is connected to the reservoir 220 via a line. The piston 212 is axially movable in the cylinder 210 in a forward direction Y1 and in a reverse direction Y2 and can be preloaded in the reverse direction Y2 by a return spring 214, as shown by way of example in FIG. 1.

To build up hydraulic pressure, the piston 212 can be moved in the forward direction Y1 by the drive assembly 100. This reduces the internal volume of the cylinder 210 and expels hydraulic fluid through the connection 211. As shown schematically in FIG. 1, the piston 212 closes the snifter bore 213 as soon as it has been moved far enough in the forward direction Y1. To reduce the pressure, the piston 212 can be moved in the reverse direction Y2 by the drive assembly 100. As soon as the piston 212 is positioned behind the snifter bore 213 with respect to the reverse direction Y2, it releases said snifter bore, so that hydraulic fluid from the reservoir 220 passes into the cylinder 210.

As mentioned above, the drive assembly 100 is designed to drive or actuate the pressure generating device 200.

Figure 2:
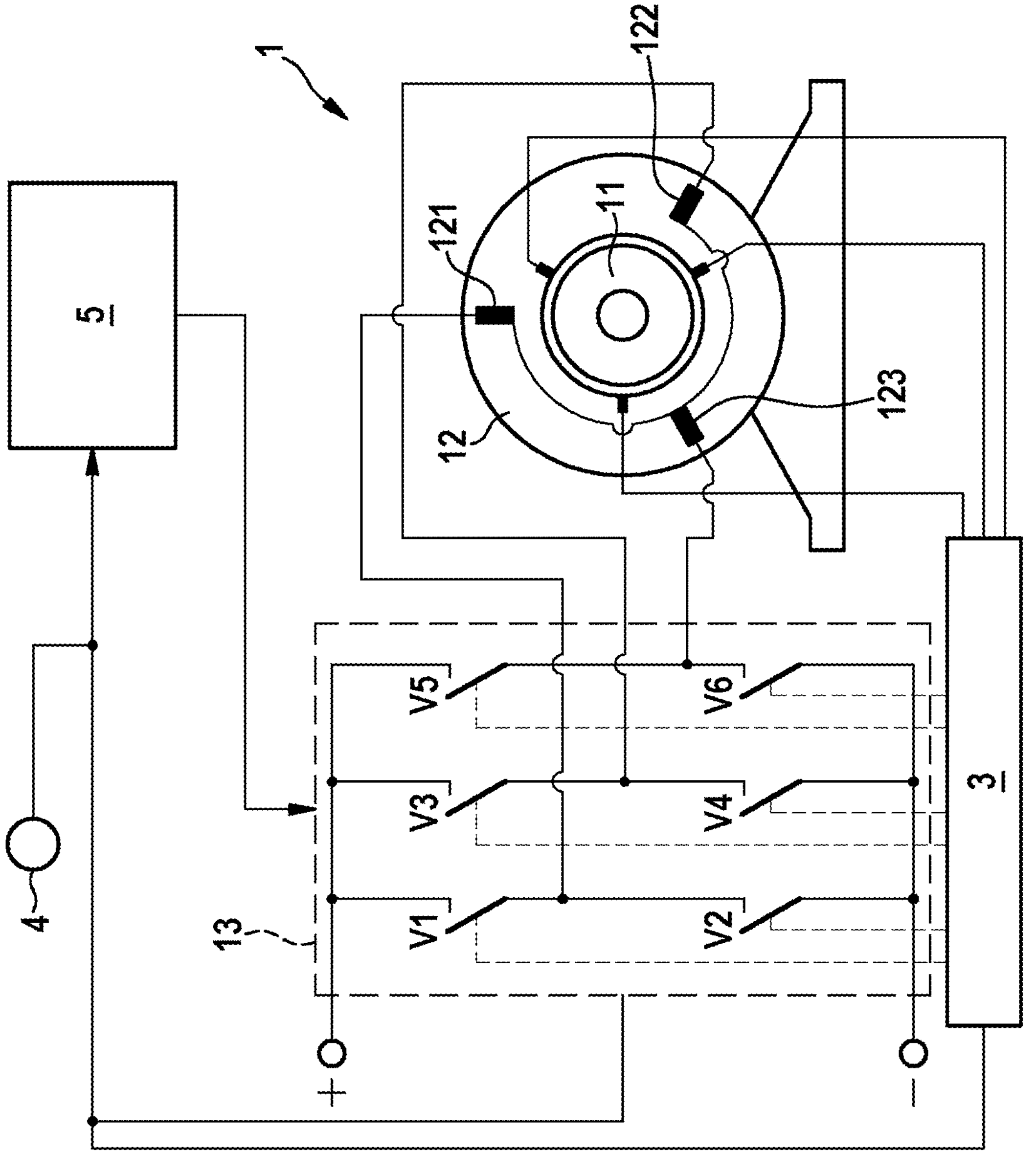
FIG. 2 is a schematic functional diagram of a drive assembly according to an exemplary embodiment of the present invention, wherein a transmission of the drive assembly is not shown.

The electric motor 1 generally has a rotor 11 and a stator 12 and is kinematically coupled to the transmission 2, in particular the rotor 11. In FIG. 2, purely by way of example, a motor 1 realized as a brushless DC motor is shown, which has a permanently excited rotor 11 and a stator 12 having three coil assemblies 121, 122, 123. Each coil assembly 121, 122, 123 forms a phase connection. The motor 1 shown by way of example in FIG. 2 further comprises a control circuit 13, which serves in particular as a commutation circuit and can be designed, for example, as a bridge circuit. In FIG. 2 it is shown by way of example that the control circuit 13 is designed as a B6 bridge circuit having electronic switching elements, for example transistors, V1-V6.

The control device 3 is electrically connected to the control circuit 13 or generally to the motor 1 and is designed to control the motor 1, in particular to control the operation of the motor 1. For example, the control device 3 can have a computing unit (not shown), in particular in the form of an ASIC (short for "application-specific integrated circuit"), and a storage unit, for example in the form of an SD memory. The control device 3 is designed in particular to output control signals. For example, the control device 3 can output control signals to the control circuit 13 to switch the switching elements V1-V6, so that the coil assemblies 121, 122, 123 of the stator 12 generate a rotating magnetic field that drives the rotor 11.

As shown in FIGS. 1 and 2, the control device is optionally also connected to the braking circuit 5 in a signal-conducting or electrical manner, as will be explained below.

Referring again to FIG. 1, it can be seen that the transmission 2 kinematically couples the motor 1 to the piston 212 or generally to the pressure generating device 200. In particular, the transmission 2 has an actuating member 20 that can be moved axially or linearly in a first and a second direction X1, X2 by the motor 2. The actuating member 20 can be, for example, a threaded spindle. Furthermore, the transmission 2 can have a guide part 21 that is connected to the threaded spindle for conjoint rotation and is guided displaceably in the first and second directions X1, X2, for example on a housing 7 in which the transmission 2 is accommodated. The threaded spindle is thus guided linearly by the guide part 21. For axial displacement of the threaded spindle, a drive nut 22 can be provided that has an internal thread that engages with an external thread of the threaded spindle. The drive nut 22 can be rotated by the motor 1, for example via a spur transmission 23 coupled to the drive shaft 10 of the motor 1, which spur transmission is in engagement with an external toothing of the drive nut 22, as shown purely by way of example in FIG. 1. Of course, other transmission paths for the torque between the motor 1 and actuating member 20 are also possible.

The actuating member 20 is, as shown schematically in FIG. 1, coupled to the pressure generating device 200, in particular to the piston 212. A displacement of the actuating member 20 in the first direction X1 actuates the pressure generating device 200 to build up pressure, for example by the actuating member 20 displacing the piston 212 in the forward direction Y1. A displacement of the actuating member 20 in the second direction X2 actuates the pressure generating device 200 to reduce pressure, for example by the actuating member 20 displacing the piston 212 in the reverse direction Y2.

In general, the actuating element can be moved between a starting position and an end actuation position. To build up pressure, the actuating member 20 is moved from the starting position in the first direction X1 toward the end actuation position.

As can be seen in FIG. 1, a restoring force F acts on the piston 212 in the reverse direction Y, which restoring force is applied by the spring 214, but in particular by the hydraulic fluid, when the pressure generating device 200 is actuated to build up pressure. If the motor 1 no longer generates torque, for example in the event of a failure of the control device 3, the restoring force F causes a movement of the actuating member 20 in the second direction X2. A distance traveled by the actuating element 20 between the starting position and the end actuation position corresponds to a maximum stroke h20 of the actuating element 20. In FIG. 1, a position Z2, which corresponds to the position of the guide part 21 in the end actuation position of the actuating member 20, and a position Z1, which corresponds to the position of the guide part 21 in the starting position of the actuating member 20, are shown by way of example.

The activation switch 4 can be designed, for example, as a mechanically actuatable switch or, as shown schematically in FIG. 1, as a proximity switch, for example as a reed or Hall switch. As shown schematically in FIG. 1, the switch 4 can be attached to the housing 7, for example. A proximity piece 41, for example in the form of a magnet, can be arranged on the guide part 21, for example, so that the switch 4 is activated when the proximity piece 41 falls below a predetermined distance relative to the switch 4, in particular when the guide part 21 moves with the actuating member 20 in the second direction X2. Of course, the switch 4 can also be provided on the guide part 21 and the proximity piece 41 on the housing 7. Alternatively, the proximity piece 41 or the switch 4 can also be attached to the actuating member 20. Preferably, the switch 4 can thus trigger a movement of the guide part 21 in the second direction X1. This also applies in the case of a mechanical switch. In general, the switch 4 can be activated by the transmission 2 as a result of a movement of the actuating member 20 in a second direction X2. When the switch 4 is activated by the transmission 2 or generally switched, the switch 4 triggers a switching process in the braking circuit 5, for example by the switch 4 outputting a signal to the braking circuit 5.

In the example in FIG. 1, the switch 4 can, for example, be arranged remote from the position Z1 in the first direction X1 by a distance s20, wherein the distance s20 optionally lies in a range between 5 percent and 40 percent of the maximum stroke h20. Thus, when moving from the end actuation position in the second direction X2, the guide part travels between 60 percent and 95 percent of the maximum stroke h20 until it activates the switch 4. The position of the actuating member 20 in which the switch 4 is activated can be referred to as the activation position. The activation position can thus be remote from the starting position by a distance s20 that lies in a range between 5 percent and 40 percent of the maximum stroke h20. In general, the switch 4 can be arranged such that the actuating member 20 in the activation position is closer to its starting position than to its end actuation position.

The braking circuit 5 is shown only symbolically in FIGS. 1 and 2 as a block and is electrically connected to the motor 1 and the switch 4. Optionally, the braking circuit 5 can additionally be electrically connected to the control device 3. The braking circuit 5 is designed as a passive electrical circuit and is designed to brake the motor 1 in the event of a failure of the control device 3. For example, the braking circuit 5 can be designed to short-circuit at least two of the three coil assemblies 121, 122, 123 shown in FIG. 2 so that they form an eddy current brake that brakes the rotating rotor 11. For this purpose, the braking circuit 5 can, for example, close at least two of the three switches V2, V4, V6.

The braking circuit 5 is designed such that it is activated when it receives an activation voltage and, in addition, the switch 4 is activated. Optionally, the braking circuit 5 can additionally be designed to detect a failure of the control device 3, in particular based on a failure signal output by the control device 3, and only to be activated when a failure of the control device 3 is detected. The activation voltage is generated by the motor 1 because its rotor 11 is rotated when the actuating member 20 is moved in the second direction X2 by the restoring force F in the event of a failure of the control device 3 and the motor 1 thus forms a generator.

Figure 3:
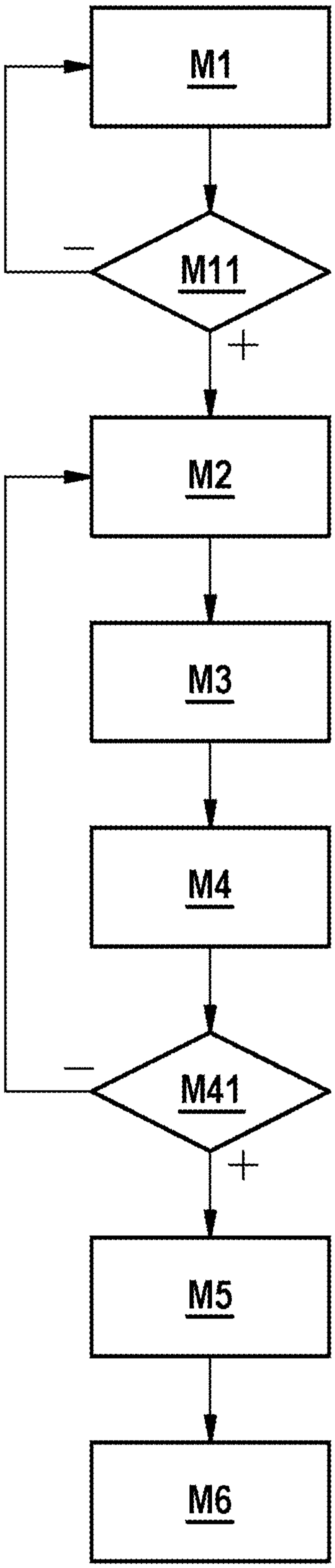
FIG. 3 is a flowchart of a method according to an exemplary embodiment of the present invention.

The electromechanical actuator 300 described above can be operated according to a method M, the sequence of which is shown schematically in FIG. 3.

In step M1, the motor 1 is controlled by the control device 3 such that the motor 1 moves the actuating member 20 in the first or second direction X1, X2 in order to build up or reduce a hydraulic pressure by means of the pressure generating device 200. For example, the control device 3 outputs control signals to the control circuit 13 of the motor 1 in order to switch the switching elements 13.

In step M11, the braking circuit 5 detects whether there is a failure of the control device 3. If a failure is not detected, as illustrated in FIG. 3 by the symbol "–", step M1 is executed. If a failure of the control device 3 is detected, as indicated in FIG. 3 by the symbol "+", the method proceeds to execute steps M2 to M5.

In step M2, the actuating member 20 is moved in the second direction X2 by the restoring force F, which acts on the actuating member 20 by the hydraulic pressure via the piston 212 or generally the pressure generating device 200. By moving the actuating member 20 in the second direction X2, the motor 1 is driven as a generator by the transmission 2 in step M3 and thereby generates an activation voltage that is applied to the braking circuit 5.

In step M4, the switch 4 is activated as a result of the movement of the actuating member 20 in the second direction X2 by the transmission 2. In particular, when the actuating member 20 reaches the activation position, i.e. in FIG. 1, for example, when the guide part 21 reaches the switch 4 during the movement in the second direction X2, the switch 4 is actuated.

In step M41, the brake control 5 detects whether the activation voltage is generated and whether the switch 4 is activated. Since the brake control 5 is designed as a passive electrical circuit, the detection step M41 can comprise, for example, actuating a first switching element of the brake control by the activation voltage and actuating a second switching element by a switching signal generated by the switch 4. If one of the two conditions is not met in step M41 (symbol "–" in FIG. 3), the method M can go back to step M2, as shown by way of example in FIG. 3. When the activation voltage and the activation of the switch are detected, as shown in FIG. 3 by the symbol "+", the braking circuit 5 is activated in step M5.

In step M6, which can also be regarded as a sub-step of step M5, the braking circuit 6 brakes the motor 1, for example by short-circuiting at least two of the three coil assemblies 121, 122, 123, as shown by way of example in FIG. 2. The motor 1 is thereby braked and generates a force counteracting the restoring force, which slows down the movement of the actuating member 20 in the second direction X2.

Figure 4:
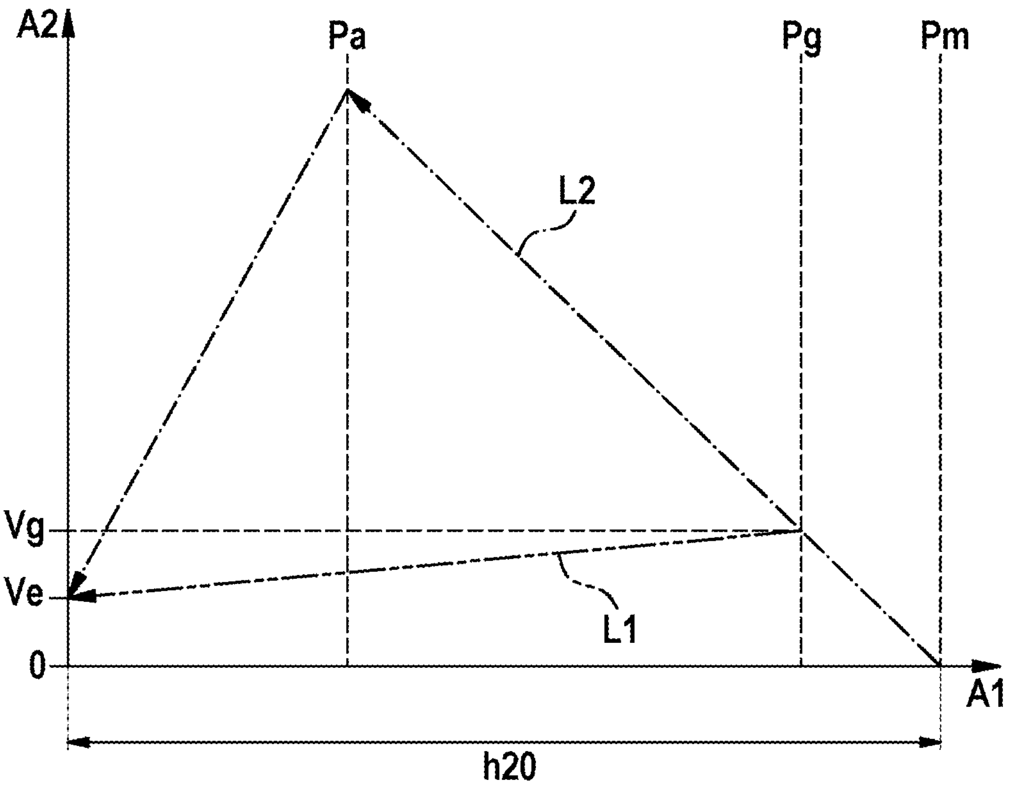
FIG. 4 is a diagram in which a movement speed of a piston of a brake actuator is plotted over the movement path.

The effect of the present invention is in particular clear in FIG. 4, which shows a diagram in which a path traveled by the piston 212 or the actuating member 20 is plotted on an abscissa A1 and a speed at which the piston 212 or the actuating member 20 moves is plotted on the ordinate.

In FIG. 4, the actuating member 20 is in its end actuation position in the position Pm, and in this position Pm the control device 3 fails. As a result, the piston 212 or the actuating member 20 accelerates substantially linearly due to the hydraulic restoring force F. From a speed Vg of the actuating member 20 (at position Pg in FIG. 4), the motor 1 begins to act as a generator and to generate an activation voltage with which the braking circuit 5 is supplied. If the braking circuit 5 were already activated at this point in time, a further speed curve would result, as shown in FIG. 4 by the double-dash line L1. As can be seen from the course of the line L1, the motor 1 is in this case immediately braked by the braking circuit 5 and the speed of the actuating member 20 or the piston 212 decreases slowly, substantially linearly, to a final speed Ve until the actuating member 20 reaches its starting position.

In the method according to the present invention or due to the structure of the actuator 300 according to the present invention with the switch 4, the speed curve shown in FIG. 4 by the dashed line L2 results. Accordingly, the motor 1 also begins to act as a generator from the position Pg of the actuating member 20 and to generate an activation voltage with which the braking circuit 5 is supplied. However, the braking circuit 5 is not yet activated, and the speed of the piston 212 or the actuating member 20 continues to increase, for example substantially linearly, until the actuating member 20 reaches the activation position Pa. At the activation position Pa, the switch 4 is activated and thereby activates the braking circuit 5, which then brakes the motor 1. Therefore, from the activation position Pa, the speed decreases again to the final speed Ve until the starting position is reached.

The time required by the actuating member 20 and thus the piston 212 to execute the maximum stroke h20 is, in the example in FIG. 4, inversely proportional to the area under the corresponding curve L1, L2. It can thus be seen that the speed curve L2 resulting from the present invention results in a significant reduction in the time required to execute the maximum stroke h20 for pressure reduction.

Although the present invention has been explained above by way of example with reference to exemplary embodiments, it is not limited thereto, but can be modified in many ways. In particular, combinations of the above exemplary embodiments are also possible.

The invention claimed is:

1. A drive assembly for an electromechanical brake actuator, comprising:

an electric motor;

a transmission kinematically coupled to the motor, the transmission having an actuating member that can be coupled to a pressure generating device and that can be linearly adjusted by the motor in a first direction against a restoring force to actuate the pressure generating device;

a control device electrically connected to the motor configured to control the motor;

a switch that can be activated by the transmission as a result of a movement of the actuating member in a second direction; and an electrical braking circuit that is electrically connected to the motor and the switch, and can be activated by activating the switch and an electrical activation voltage, wherein the activation voltage is generated by the motor when the motor acts as a generator in the event of a failure of the control device by absorbing the restoring force acting on the actuating member, and wherein the braking circuit is configured to brake the motor in order to generate a force that counteracts the restoring force using the motor.

2. The drive assembly according to claim 1, wherein the braking circuit is further configured to detect a failure of the control device, based on a failure signal output by the control device, and is activated only when a failure of the control device is detected.

3. The drive assembly according to claim 1, wherein the actuating member is movable between a starting position and an end actuation position, wherein the restoring force biases the actuating member in a direction of a starting position, and wherein the switch is arranged such that the switch is activated in an activation position of the actuating member in which the actuating member is closer to the starting position than to an end actuation position.

4. The drive assembly according to claim 3, wherein the starting position and the end actuation position define a maximum stroke of the actuating member, and wherein the activation position is remote from the starting position by a distance in a range between 5 percent and 40 percent of the maximum stroke.

5. The drive assembly according to claim 1, wherein the switch is: (i) a proximity switch including a reed switch or a Hall switch, or (ii) a mechanically triggered switch.

6. The drive assembly according to claim 1, wherein the actuating member is formed by a threaded spindle that is linearly guided by a guide part connected thereto for conjoint rotation and is linearly adjustable by a drive nut that can be rotated by the motor, wherein the switch can be triggered by the guide part.

7. The drive assembly according to claim 1, wherein the motor is a brushless DC motor having a permanently excited rotor, a stator that has at least three coil assemblies, and a commutation circuit connected to the coil assemblies, which commutation circuit can be controlled by the control device, and wherein the braking circuit is configured to short-circuit at least two of the coil assemblies, so that the at least two of the coil assemblies act as an eddy current brake.

8. An electromechanical brake actuator, comprising:

a drive assembly including:

an electric motor, a transmission kinematically coupled to the motor, the transmission having an actuating member that can be coupled to a pressure generating device and that can be linearly adjusted by the motor in a first direction against a restoring force to actuate the pressure generating device, a control device electrically connected to the motor configured to control the motor, a switch that can be activated by the transmission as a result of a movement of the actuating member in a second direction, and an electrical braking circuit that is electrically connected to the motor and the switch, and can be activated by activating the switch and an electrical activation voltage, wherein the activation voltage is generated by the motor when the motor acts as a generator in the event of a failure of the control device by absorbing the restoring force acting on the actuating member, and wherein the braking circuit is configured to brake the motor in order to generate a force that counteracts the restoring force using the motor; and the pressure generating device that is coupled to the actuating member of the transmission and has a hydraulic connection for providing hydraulic fluid to a wheel brake.

9. The brake actuator according to claim 8, wherein the pressure generating device has a cylinder and a piston received in the cylinder, the piston being movable by the actuating member in a forward direction and a reverse direction to displace hydraulic fluid, wherein the hydraulic connection is formed by a connection bore in the cylinder, and wherein the cylinder has a snifter bore that is exposed by the piston when the piston is moved in the reverse direction to connect the cylinder to a reservoir.

10. A method for operating an electromechanical brake actuator which includes:

an electric motor, a transmission kinematically coupled to the motor, the transmission having an actuating member that can be coupled to a pressure generating device and that can be linearly adjusted by the motor in a first direction against a restoring force to actuate the pressure generating device, a control device electrically connected to the motor configured to control the motor, a switch that can be activated by the transmission as a result of a movement of the actuating member in a second direction, and an electrical braking circuit that is electrically connected to the motor and the switch, and can be activated by activating the switch and an electrical activation voltage, wherein the activation voltage is generated by the motor when the motor acts as a generator in the event of a failure of the control device by absorbing the restoring force acting on the actuating member, and wherein the braking circuit is configured to brake the motor in order to generate a force that counteracts the restoring force using the motor;

the method comprising the following steps:

controlling the motor using the control device such that the motor moves the actuating member in the first direction or the second direction in order to build up or reduce a hydraulic pressure using the pressure generating device;

wherein in the event of a failure of the control device:

a restoring force acting as a result of the built-up hydraulic pressure moves the actuating member in the second direction, the actuating member moving in the second direction drives the motor as a generator, so that the motor generates an activation voltage, the switch is activated by the transmission as a result of the movement of the actuating member in the second direction, the braking circuit is activated when the braking circuit is supplied with the activation voltage and the switch is activated, and the braking circuit brakes the motor so that the motor generates a force counteracting the restoring force, which slows down the movement of the actuating member in the second direction.

* * * * *